US011283805B2

(12) United States Patent
Jiang

(10) Patent No.: US 11,283,805 B2
(45) Date of Patent: Mar. 22, 2022

(54) CLOUD DEVICE ACCOUNT CONFIGURATION METHOD, APPARATUS AND SYSTEM, AND DATA PROCESSING METHOD

(71) Applicant: Alibaba Group Holding Limited, Grand Cayman (KY)

(72) Inventor: Xizhe Jiang, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 332 days.

(21) Appl. No.: 16/512,186

(22) Filed: Jul. 15, 2019

(65) Prior Publication Data

US 2020/0021596 A1 Jan. 16, 2020

(30) Foreign Application Priority Data

Jul. 16, 2018 (CN) .......................... 201810778187.6

(51) Int. Cl.
*H04L 29/06* (2006.01)

(52) U.S. Cl.
CPC .......... *H04L 63/102* (2013.01); *H04L 63/083* (2013.01); *H04L 63/0807* (2013.01);
(Continued)

(58) Field of Classification Search
CPC ............... H04L 63/102; H04L 63/0884; H04L 63/0853; H04L 63/0807; H04L 63/083;
(Continued)

(56) References Cited

U.S. PATENT DOCUMENTS 8,842,815 B2 9/2014 Connelly et al.
9,590,817 B2 3/2017 Kim et al.
(Continued)

FOREIGN PATENT DOCUMENTS

AU 2015200102 B2 2/2015
CN 102333090 A 1/2012
(Continued)

OTHER PUBLICATIONS

Translation of CN Office Action for corresponding CN Application No. 201810778187.6 dated Oct. 28, 2021, a counterpart foreign application for U.S. Appl. No. 16/512,186, 11 pages.
(Continued)

*Primary Examiner* — Jeffrey C Pwu
*Assistant Examiner* — Nega Woldemariam
(74) *Attorney, Agent, or Firm* — Lee & Hayes, P.C.

(57) ABSTRACT

A method for configuring an account of a cloud device including obtaining a sub-account corresponding to a currently logged-in primary account, wherein the primary account has a permission to access a cloud resource, and the sub-account has a part or all of the permission of the primary account; and importing the sub-accounts into the target cloud device to log in to the target cloud device through the sub-account to perform operation and maintenance on the target cloud device, wherein the cloud resource includes the target cloud device. The present disclosure solves the technical problem that, in the conventional techniques, the gateway account needs to be created for each gateway separately, which causes the complicated account configuration of the gateway.

17 Claims, 10 Drawing Sheets

(52) U.S. Cl.
CPC ...... *H04L 63/0853* (2013.01); *H04L 63/0884* (2013.01); *H04L 2463/082* (2013.01)

(58) Field of Classification Search
CPC . H04L 2463/082; H04L 63/105; H04L 63/20; H04L 41/28; H04L 63/0876
USPC .......................................................... 726/4
See application file for complete search history.

(56) References Cited

U.S. PATENT DOCUMENTS

| | | | |
|---|---|---|---|
| 2004/0025050 A1* | 2/2004 | Godwin | H04L 61/1552 726/4 |
| 2010/0146607 A1 | 6/2010 | Piepenbrink et al. | |
| 2014/0164254 A1 | 6/2014 | Dimmick | |
| 2017/0063968 A1 | 3/2017 | Kitchen et al. | |
| 2017/0118037 A1 | 4/2017 | Kitchen et al. | |
| 2017/0200160 A1* | 7/2017 | Kumar | H04L 63/083 |

FOREIGN PATENT DOCUMENTS

| | | |
|---|---|---|
| CN | 102724302 A | 10/2012 |
| CN | WO2014005552 A1 | 1/2014 |
| CN | 106101054 A | 11/2016 |
| CN | 106330899 A | 1/2017 |
| CN | 106534219 A | 3/2017 |
| CN | 106789153 A | 5/2017 |
| CN | 107820117 B | 3/2018 |
| CN | 107846428 A | 3/2018 |
| CN | 107943069 A | 4/2018 |
| CN | WO2019052153 A1 | 3/2019 |
| CN | WO2019080452 A1 | 5/2019 |
| SG | WO2018217165 A2 | 11/2018 |
| TW | M562452 U | 6/2018 |

OTHER PUBLICATIONS

Translation of CN Office Action for corresponding CN Application No. 201810778187.6 dated Jul. 22, 2021, a counterpart foreign application for U.S. Appl. No. 16/512,186, 11 pages.

Translation of CN Search Report for corresponding CN Application No. 201810778187.6 dated Jul. 15, 2021, a counterpart foreign application for U.S. Appl. No. 16/512,186, 2 pages.

Translation of CN Supplementary Search Report for corresponding CN Application No. 201810778187.6 dated Oct. 22, 2021, a counterpart foreign application for U.S. Appl. No. 16/512,186, 1 page.

* cited by examiner

CLOUD DEVICE ACCOUNT CONFIGURATION METHOD, APPARATUS AND SYSTEM, AND DATA PROCESSING METHOD

CROSS REFERENCE TO RELATED PATENT APPLICATIONS

This application claims priority to Chinese Patent Application No. 201810778187.6 filed on 16 Jul. 2018 and entitled "Cloud Device Account Configuration Method, Apparatus and System, and Data Processing Method," which is incorporated herein by reference in its entirety.

TECHNICAL FIELD

The present disclosure relates to the field of cloud computing technologies, and, more particularly, to account configuration methods, apparatuses and systems, and data processing methods for the cloud devices.

BACKGROUND

The gateway service is provided by one or more gateway instances. Currently, the gateway usually uses a self-built account or uses an active directory (AD), a Lightweight Directory Access Protocol (LDAP) account. Thus, the account needs to be reset for each gateway instance. The configuration process is cumbersome, and the configuration between one or more gateway instances cannot be shared. When the user runs the virtual server through the gateway, different login accounts are required for different cloud gateway instances, and the login process is also very complicated.

In view of the problem that a specific gateway account needs to be created for each gateway, which causes the complicated account configuration of the gateway, no effective solution has been proposed yet.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The example embodiments of the present disclosure provide account configuration methods, devices and systems and data processing methods for cloud devices, to at least solve the technical problem that the existing gateway techniques needs to build a specific gateway account for each gateway, which results in a complicated account configuration of the gateway.

According to an aspect of the example embodiments of the present disclosure, a method for configuring an account of a cloud device is provides, which includes obtaining a sub-account corresponding to a currently logged-in primary account, wherein the primary account has a permission to access a cloud resource, and the sub-account has a part or all of the permission of the primary account; and importing the sub-accounts into the target cloud device to log in to the target cloud device through the sub-account to perform operation and maintenance on the target cloud device, wherein the cloud resource includes the target cloud device.

According to an aspect of the example embodiment of the present disclosure, another method for configuring an account of a cloud device is provided, which includes receiving a sub-account sent by a cloud console, wherein the sub-account corresponds to a primary account that currently logs into the cloud console, wherein the primary account has a permission to access a cloud resource, and the sub-account has a part or all of the permission of the primary account; determining a target cloud device selected from the cloud device; and importing the sub-account to the target cloud device to log in to the target cloud device through the sub-account to perform operation and maintenance on the target cloud device, wherein the cloud resource includes the target cloud device.

According to an aspect of the example embodiment of the present disclosure, a method for configuring an account of a cloud device is provided, which includes obtaining a sub-account corresponding to a currently logged-in primary account, wherein the primary account has a permission to access a cloud resource, and the sub-account has a part or all of the permission of the primary account; and importing the sub-account to the target gateway to log in to the target gateway through the sub-account to perform operation and maintenance on the target gateway, the cloud resource including the target gateway.

According to an aspect of the present example embodiment of the present disclosure, an apparatus for configuring an account of a cloud device is provided, which includes a first obtaining module that obtains a sub-account corresponding to a currently logged-in primary account, wherein the primary account has a permission to access a cloud resource, and the sub-account has a part or all of the permission of the primary account; and a first importing module that imports the sub-accounts into the target cloud device to log in to the target cloud device through the sub-account to perform operation and maintenance on the target cloud device, wherein the cloud resource includes the target cloud device.

According to an aspect of the example embodiment of the present disclosure, another apparatus for configuring an account of a cloud device is provided, which includes a receiving module that receives a sub-account sent by a cloud console, wherein the sub-account corresponds to a primary account that currently logs into the cloud console, wherein the primary account has a permission to access a cloud resource, and the sub-account has a part or all of the permission of the primary account; a determining module that determines a target cloud device selected from the cloud device; and a second importing module that imports the sub-account to the target cloud device to log in to the target cloud device through the sub-account to perform operation and maintenance on the target cloud device, wherein the cloud resource includes the target cloud device.

According to an aspect of the example embodiment of the present disclosure, another apparatus for configuring an account of a cloud device is provided, which includes a second obtaining module that obtains a sub-account corresponding to a currently logged-in primary account, wherein the primary account has a permission to access a cloud resource, and the sub-account has a part or all of the permission of the primary account; and a third importing module that imports the sub-account to the target gateway to log in to the target gateway through the sub-account to perform operation and maintenance on the target gateway, the cloud resource including the target gateway.

According to an aspect of the example embodiments of the present disclosure, one or more memories storing computer-readable instructions that, when executed by one or more processors, cause the one or more processors to perform acts including obtaining a sub-account corresponding to a currently logged-in primary account, wherein the primary account has a permission to access a cloud resource, and the sub-account has a part or all of the permission of the primary account; and importing the sub-accounts into the target cloud device to log in to the target cloud device through the sub-account to perform operation and maintenance on the target cloud device, wherein the cloud resource includes the target cloud device.

According to an aspect of the example embodiments of the present disclosure, one or more processors are provided to execute computer-readable instructions to perform acts including obtaining a sub-account corresponding to a currently logged-in primary account, wherein the primary account has a permission to access a cloud resource, and the sub-account has a part or all of the permission of the primary account; and importing the sub-accounts into the target cloud device to log in to the target cloud device through the sub-account to perform operation and maintenance on the target cloud device, wherein the cloud resource includes the target cloud device.

According to an aspect of the example embodiments of the present disclosure, a system for configuring an account of a cloud device is provides, which includes one or more processors and one or more memories storing computer-readable instructions that, when executed by the one or more processors, cause the one or more processors to perform acts including obtaining a sub-account corresponding to a currently logged-in primary account, wherein the primary account has a permission to access a cloud resource, and the sub-account has a part or all of the permission of the primary account; and importing the sub-accounts into the target cloud device to log in to the target cloud device through the sub-account to perform operation and maintenance on the target cloud device, wherein the cloud resource includes the target cloud device.

According to an aspect of the example embodiments of the present disclosure, a data processing method is provided, which includes obtaining a sub-account of a first account, wherein the first account has a permission to access a first set of network devices, and the sub-account has a part or all of the permission of the first account, the first set of network devices include a second network device and a third network device corresponding to the second network device; and importing the sub-accounts into the second network device; logging into the second network device using the sub-account; and accessing the third network device by using the sub-account.

In the example embodiment of the present disclosure, the sub-account corresponding to the currently logged-in primary account is obtained, wherein the primary account has a permission to access a cloud resource, and the sub-account has a part or all of the permission of the primary account; and the sub-account is imported into the target cloud device so that the target cloud device is logged into through the sub-account to perform operation and maintenance on the target cloud device. The above technical solutions allow the user to directly log in to the gateway through the sub-account, thereby eliminating the need to configure an account system for each gateway and eliminating the complicated process of configuring an account system for each gateway.

Therefore, the example embodiment of the present disclosure solves the technical problem that the conventional gateway techniques need to build a specific gateway account for each gateway, which results in a complicated and complicated account configuration of the gateway.

DRAWINGS

The drawings described herein are intended to provide a further understanding of the present disclosure, and are intended to be a part of the present disclosure. The example embodiments and the accompanying drawings are used to illustrate the present disclosure and do not constitute improper limitation to the present disclosure. In the drawings.

DETAILED DESCRIPTION

Figure 1:
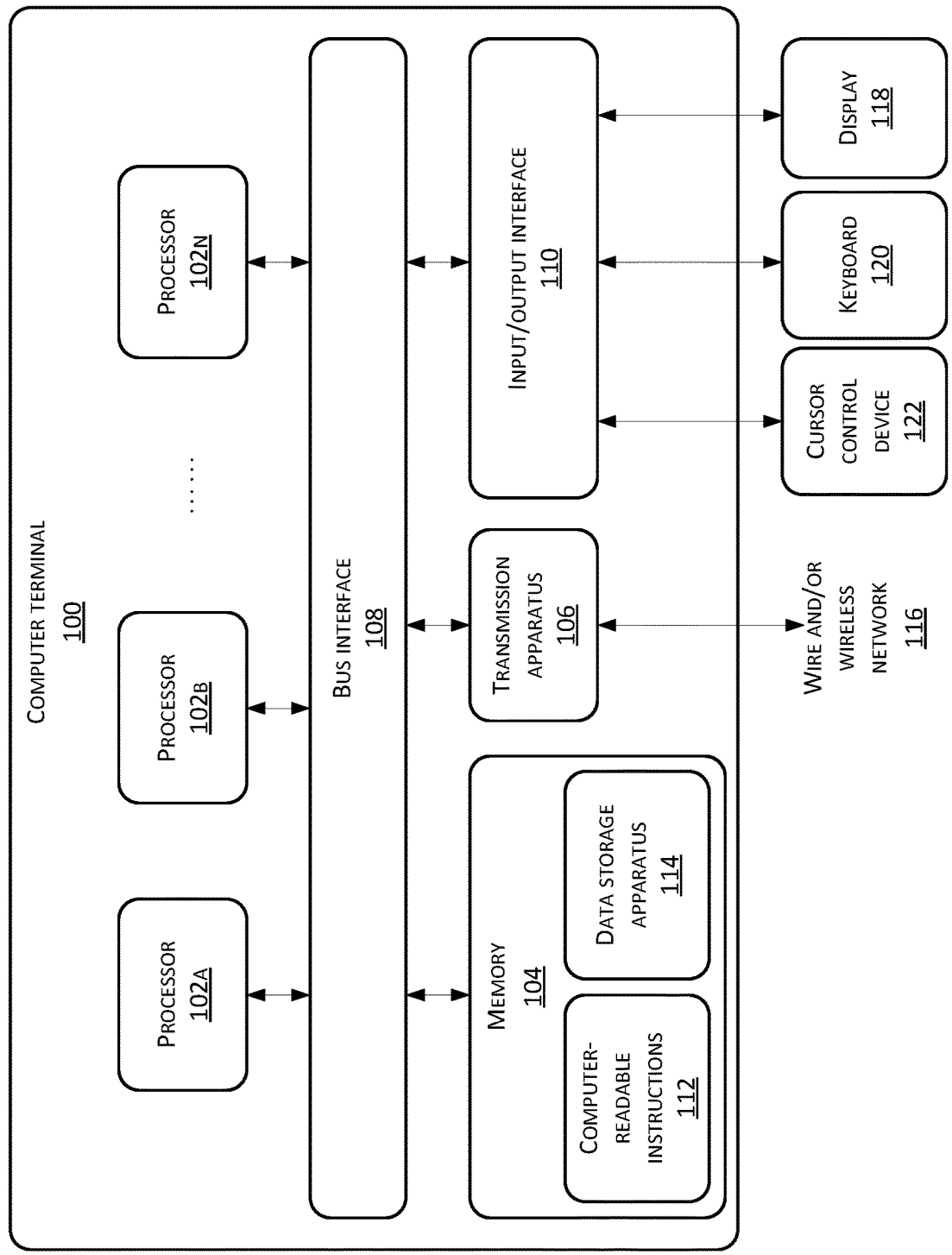
FIG. 1 is a block diagram showing the hardware structure of a computer terminal (or mobile device) for implementing an account configuration method of a cloud device.

To enable those skilled in the art to better understand the solutions of the present disclosure, the technical solutions in example embodiments of the present disclosure will be described clearly and completely below with reference to the accompanying drawings. Apparently, the described example embodiments merely represent a part, rather than all, of the example embodiments of the present disclosure. All other example embodiments derived by those of ordinary skill in the art based on the example embodiments of the present disclosure without creative efforts should fall in the protection scope of the present disclosure.

It should be noted that, in the specification, claims and accompanying drawings of the present disclosure, terms such as "first" and "second" are used to distinguish similar objects, but are not necessarily used to describe a specific order or sequence. It should be understood that data used as such may be exchanged in appropriate cases, and thus the example embodiments of the present disclosure described here may be implemented in an order other than those shown or described here. Moreover, terms "include/comprise", "have" and any variations thereof intend to cover non-exclusive inclusion. For example, processes, methods, systems, products or devices including a series of steps or units are not limited to the steps or units clearly listed, but may include other steps or units that are not clearly listed or inherent to the processes, methods, products or devices.

Some nouns or terms appearing during description of the example embodiments of the present disclosure are applicable to the following explanations:

Gateway: in a network environment, a computing apparatus that uses various techniques to collect and monitor the system status, security events, and network activities of each component in the network environment in real time, as well as centralizes alarms, timely processes, i.e., audit and liability determination, to protect the network and data from intrusion and destruction from external and internal users.

Cloud account: a service account to control access of a cloud resource. An example technical solution in this present disclosure is to introduce a cloud account for the cloud gateway and uses the cloud account as part of its account system.

According to an example embodiment of the present disclosure, a method for configuring an account of a cloud device is provided. It should be noted that the steps shown in the flowchart of the drawing may be executed by a computer system that executes computer-readable instructions. Although a logical order is shown in the flowcharts, in some cases the steps shown or described may be performed in a different order than the one described herein.

The method example embodiment may be performed by a mobile terminal, a computer terminal or a similar apparatus. FIG. 1 shows a hardware structural block diagram of a computer terminal (or mobile device) for implementing a method for configuring an account of a cloud device.

As shown in FIG. 1, a computer terminal 100 (such as a mobile device) may include one or more processors (shown as 102a, 102b, . . . , 102n in FIG. 4, wherein n may be any integer) (the processor(s) 402 may include, but is not limited to, a processing apparatus such as a microprocessor (MCU) or a programmable logic device (FPGA)), a memory 104 configured to store data, and a transmission apparatus 106 for communication functions. In addition, the computer terminal 100 may also include: a bus interface 108, an input/output interface (I/O interface) 110. The bus interface 108 transmits data between the processor 102, the memory 104, the transmission apparatus 106, and the input/output interface 110. For example, a universal serial bus (USB) port may be included as one of the ports of the I/O interface 110. The computer terminal 100 may also include a network interface, a power supply and/or a camera (not shown in FIG. 1). It will be understood by those skilled in the art that the structure shown in FIG. 1 is merely illustrative and does not limit the structure of the above electronic device. For example, the computer terminal 100 may also include more or fewer components than those shown in FIG. 1, or have a configuration different from that shown in FIG. 1.

It should be noted that the one or more processors 102 and/or other data processing circuits may generally be referred to as "data processing circuits" in the present disclosure. The data processing circuit may be embodied completely or partially as software, hardware, firmware or any other combination. Moreover, the data processing circuit may be a single, independent determining module, or incorporated completely or partially into any of other elements in the computer terminal 100. As referred to in the example embodiment of the present disclosure, the data processing circuit works as a processor to control, e.g., selection of a variable resistance terminal path connected to the interface.

The memory 104 may be configured to store software programs and modules of application software, such as computer-readable instructions 112 or data storage apparatus 114 corresponding to the file processing method in the example embodiment of the present disclosure. The processor 102 executes the software programs and modules stored in the memory 404, thus performing various functional applications and data processing, that is, implementing the file processing method. The memory 104 may include a high-speed random-access memory and may also include a non-volatile memory, such as one or more magnetic storage apparatuses, a flash memory, or other non-volatile solid-state memories. In some examples, the memory 104 may further include memories placed remote to the processor 102. These remote memories may be connected to the computer terminal 100 over a network. Examples of the network include, but are not limited to, the Internet, an intranet, a local area network, a mobile communication network, and a combination thereof.

The transmission apparatus 106 is configured to receive or send data via a network. A specific example of the network may include a wire and/or wireless network 116 provided by a communication provider of the computer terminal 100. In one example, the transmission apparatus 106 includes a Network Interface Controller (NIC) that may be connected to other network devices through a base station to communicate with the Internet. In one example, the transmission apparatus 406 may be a Radio Frequency (RF) module for communicating with the Internet wirelessly.

The input/out interface interacts with one or more peripheral device such as a display 118, a keyboard 120, and a cursor control device 122 such as a mouse.

The display 118 may be, for example, a touch screen-type liquid crystal display (LCD) that allows a user to interact with a user interface of the computer terminal 100.

It should be noted here that, in some optional example embodiments, the computer device (or the mobile device) shown in FIG. 1 may include hardware elements (including circuits), software elements (including computer codes stored on a computer readable medium), or a combination of both hardware and software elements. It should be noted that FIG. 1 is only an example, and is intended to show the types of components that may be present in the computer device (or the mobile device).

Figure 2:
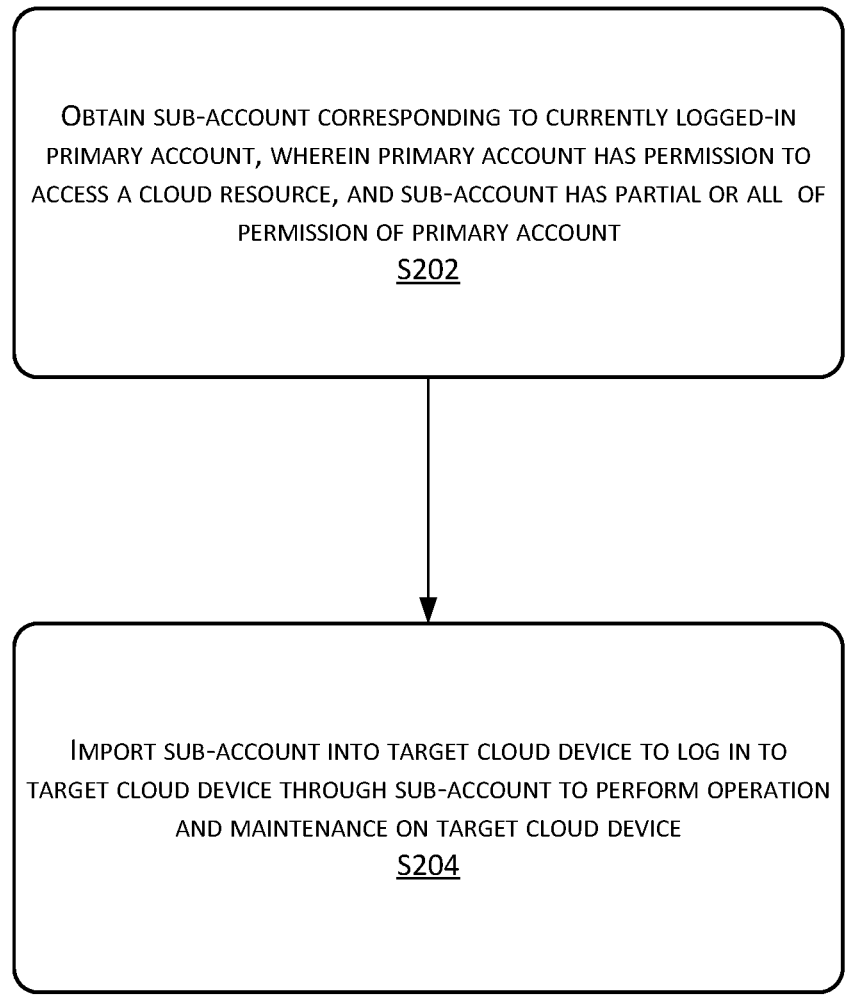
FIG. 2 is a flowchart of a method for configuring an account of a cloud device according to an example embodiment of the present disclosure.

In the above operating environment, the present disclosure provides a method for configuring an account of a cloud device. FIG. 2 is a flowchart of a method for configuring an account of a cloud device according to an example embodiment of the present disclosure.

Step S202: a sub-account corresponding to the currently logged-in primary account is obtained. The primary account has a permission to access a cloud resource, and the sub-account has a part or all of the permission of the primary account.

The above step may be performed by a cloud console. The cloud console provides the users with services including user identity management and resource access control. In the cloud console, a corresponding sub-account is created or managed, and a privilege or permission of the sub-account is controlled.

For example, the primary account is an account registered at the cloud console, and is a type of cloud account. The primary account has the permission to access all resources on the cloud and a sub-account is generated under the primary account and a permission is assigned to the generated sub-account.

For example, taking the primary account of an enterprise as an example, the enterprise registers a primary account on the cloud console, and the primary account has the permission to access all resources on the cloud. In order to facilitate access to resources on the cloud by various departments within the enterprise, the enterprise generates one or more sub-accounts on the cloud console through the primary account, and assigns corresponding permissions to the sub-accounts. For instance, the sub-account corresponding to the finance department has only the permission to access financial-related resources so that each department has access to resources related to its own business.

Step S204: the sub-account is imported into the target cloud device to log in to the target cloud device through the sub-account to perform operation and maintenance on the target cloud device.

For example, the cloud resource includes the target cloud device. The cloud device may be the gateway. The target device may be a gateway whose sub-account has permission to access the cloud resource.

In an example embodiment, by still using the primary account of the enterprise as an example, the sub-account created by the enterprise through the primary account is still a cloud account. The enterprise also assigns corresponding privilege or permission to the created sub-account. With respect to a sub-account, the gateway that the sub-account is allowed to access within its permission is the target device of the sub-account. According to step 204, the sub-account is imported into the corresponding target gateway so that the sub-account is used to log into the target gateway.

After the sub-account is imported into the target gateway, the target gateway determines whether an account that requests to log in has the permission to access the cloud resource. For example, when the target gateway receives the log-in request from the sub-account, the target gateway verifies the sub-account and allows the sub-account to log in after successful authentication.

Figure 3:
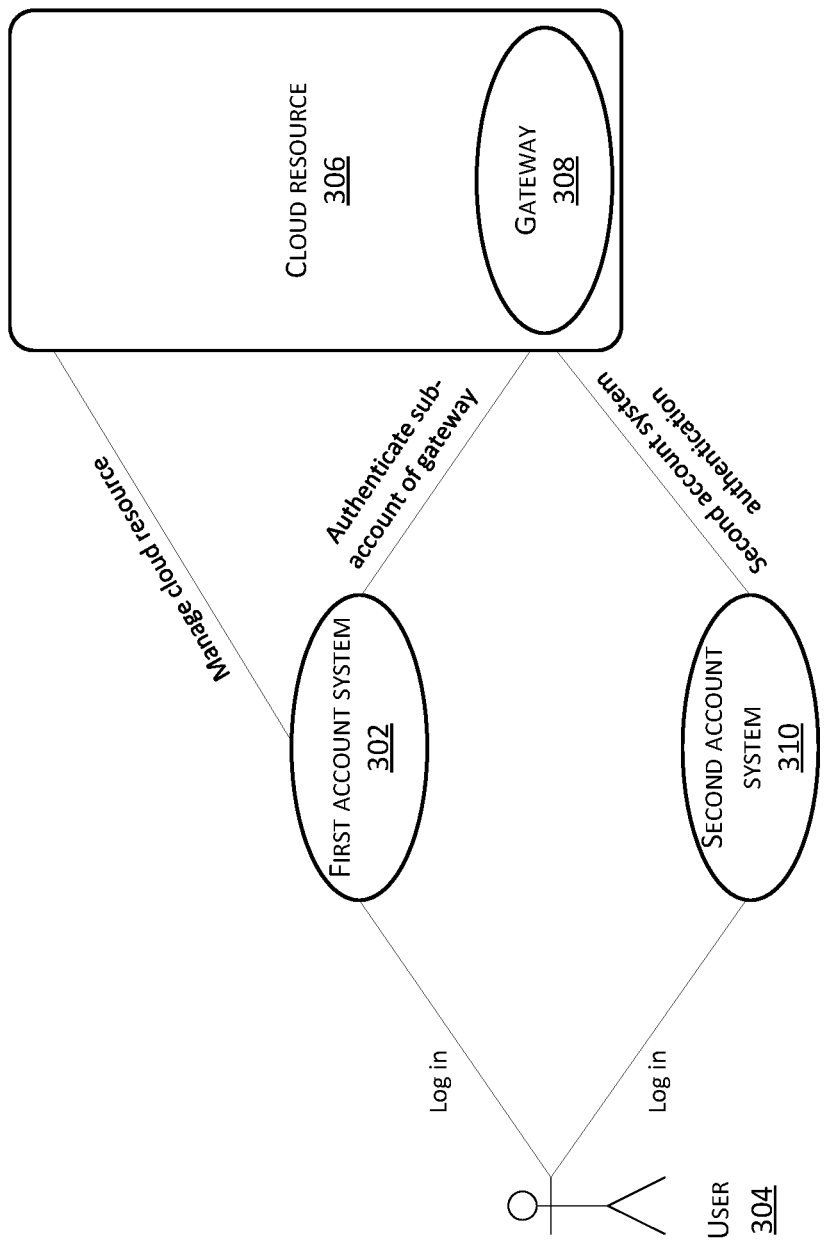
FIG. 3 is a schematic diagram of performing operation and maintenance on a gateway after importing a sub-account to the gateway according to an example embodiment of the present disclosure.

FIG. 3 is a schematic diagram of operation and maintenance of a gateway after importing a sub-account to the gateway according to an example embodiment of the present disclosure. In the conventional techniques, the cloud console has a corresponding first account system 302. After logging in to the first account system 302, a user 304 accesses and manages a cloud resource 306 (including operation and maintenance of a gateway 308). The gateway 308 includes its own second account system 310, and if the user 304 needs to log in to the gateway 308, the gateway needs to be logged in through the second account system 310 of the gateway 308.

In the above example embodiment, the sub-account corresponding to the primary account is imported to the gateway 308, so that the user 304 authenticates the sub-account of the gateway 308 through the first account system 302 of the cloud console, thereby directly logging in to the gateway 308. With respect or the user 304, there is no need to memorize one or more accounts, and with respect to the gateway 308, the second account system 310 that separately maintained by the gateway 308 becomes optional rather than necessary. Further, the above example embodiment also achieves shared the gateway account system between a plurality of gateway instances. There is no need to configure an account for each gateway instance, and thus the account configuration of the gateway 308 becomes simple and compatible.

In the example embodiment of the present disclosure, the sub-account corresponding to the currently logged-in primary account is obtained, wherein the primary account has a permission to access a cloud resource, and the sub-account has a part or all of the permission of the primary account; and the sub-account is imported into the target cloud device so that the target cloud device is logged into through the sub-account to perform operation and maintenance on the target cloud device. The above technical solutions allow the gateway to be compatible with the cloud account so that the user directly logs in to the gateway through the sub-account, thereby eliminating the need to configure an account system for each gateway and eliminating the complicated process of configuring an account system for each gateway.

Therefore, the example embodiment of the present disclosure solves the technical problem that the conventional gateway techniques need to create a specific gateway account for each gateway, which results in a complicated and complicated account configuration of the gateway.

For example, the obtaining the sub-account corresponding to the currently logged-in primary account includes: determining whether the primary account has a sub-account; if the primary account does not have the sub-account, creating the sub-account; if the primary account has created the sub-account, obtaining the sub-account.

For example, if the currently logged-in primary account already has a corresponding sub-account, that is, the sub-account has created, the existing sub-account is directly used to write to the target cloud device; if the currently logged-in primary account does not have a sub-account, the sub-account corresponding to the primary account is created.

For example, after the sub-account is created, the method further includes: configuring a multi-factor authentication (MFA) function for the sub-account, and the MFA function includes account password authentication and dynamic authentication code authentication.

For example, the above-mentioned MFA is a security system for performing one or more identity authentications, and the purpose is to establish a multi-level defense, so that unauthorized users cannot log in to the sub-account.

For instance, the MFA function includes account password authentication and dynamic authentication code authentication, and such two authentications are required when the user logs in to the target cloud device through the sub-account.

For example, a user logs into the sub-accounts through the cloud console, and enters the account name and password of the sub-accounts in the log-in interface. The cloud console verifies the password. When the account name is a cell phone of the user, if the password is verified to correspond to the account name, a dynamic authentication code is sent to the cell phone of the user. After the user inputs the dynamic authentication code received by the cell phone to the corresponding position, the cloud console further verifies the dynamic authentication code, and the user is allowed to log in after the authentication is successful.

In the above example solution, by configuring the MFA function to the sub-account, the security of using the sub-account to log in the gateway is provided.

For example, the importing the sub-account to the target cloud device includes: synchronizing the sub-account to the cloud device console, and importing by the cloud device console the sub-account to the target cloud device selected from one or more cloud devices.

For example, when the cloud device is the gateway, the cloud device console is the gateway console. The gateway console is used for managing the gateway. In the above steps, the cloud console sends the sub-account to the console of the target cloud device, i.e., the console of the target gateway. The gateway console selects the gateway instance, i.e., selects the target gateway. Through logging into the administration page of the gateway instance, the sub-account of the gateway is introduced into the corresponding gateway instance.

For example, the logging-into the target cloud device through the sub-account includes: logging into the cloud device console through the sub-account; authenticating the sub-account by the cloud device console, generating a token that does not require registration after the authentication is successful, and using the token to log into the target cloud device.

For example, the cloud device console directly logs into the gateway instance using the technical solutions such as the token to avoid the process of inputting the account name and password. Such process is a process that does not require registration. When the cloud device console sends the token that does not require registration to the target cloud device, the target cloud device allows the current account to log in without registration.

In the above step, the authentication by the cloud device console to the sub-account may be MFA authentication of the sub-account to confirm the validity of the current account. After the authentication is successful, the user is determined to be valid to log into the target cloud device.

However, if the user directly logs in the target cloud device, the target cloud device needs to authenticate the identity of the user again, that is, the user needs to repeatedly input the account and the password. Therefore, the cloud device console sends the token that does not require registration to the target cloud device. After receiving the token that does not require registration issued by the cloud device console, the target cloud device waives the process of inputting the account and password required for logging in to the gateway.

For example, the logging into the target cloud device by using the sub-account includes: logging in the target cloud device by using the sub-account, and sending by the target cloud device the sub-account to the cloud device console for authentication.

In the above technical solution, the cloud device console authenticates the sub-account used by the user to log in.

For another example, the user inputs account information (account name and password number) in the login interface of the cloud console. The cloud console forwards the received account information to the target cloud device. The target cloud device then sends the account information to the cloud device console for authentication by the cloud device console.

Since the sub-account has been written to the target cloud device, the cloud device console successfully authenticates the sub-account if the account information is correct.

For example, the cloud device includes a gateway.

For example, the operation and maintenance of the target cloud device includes: controlling, by the gateway, a virtual server corresponding to the gateway.

Figure 4:
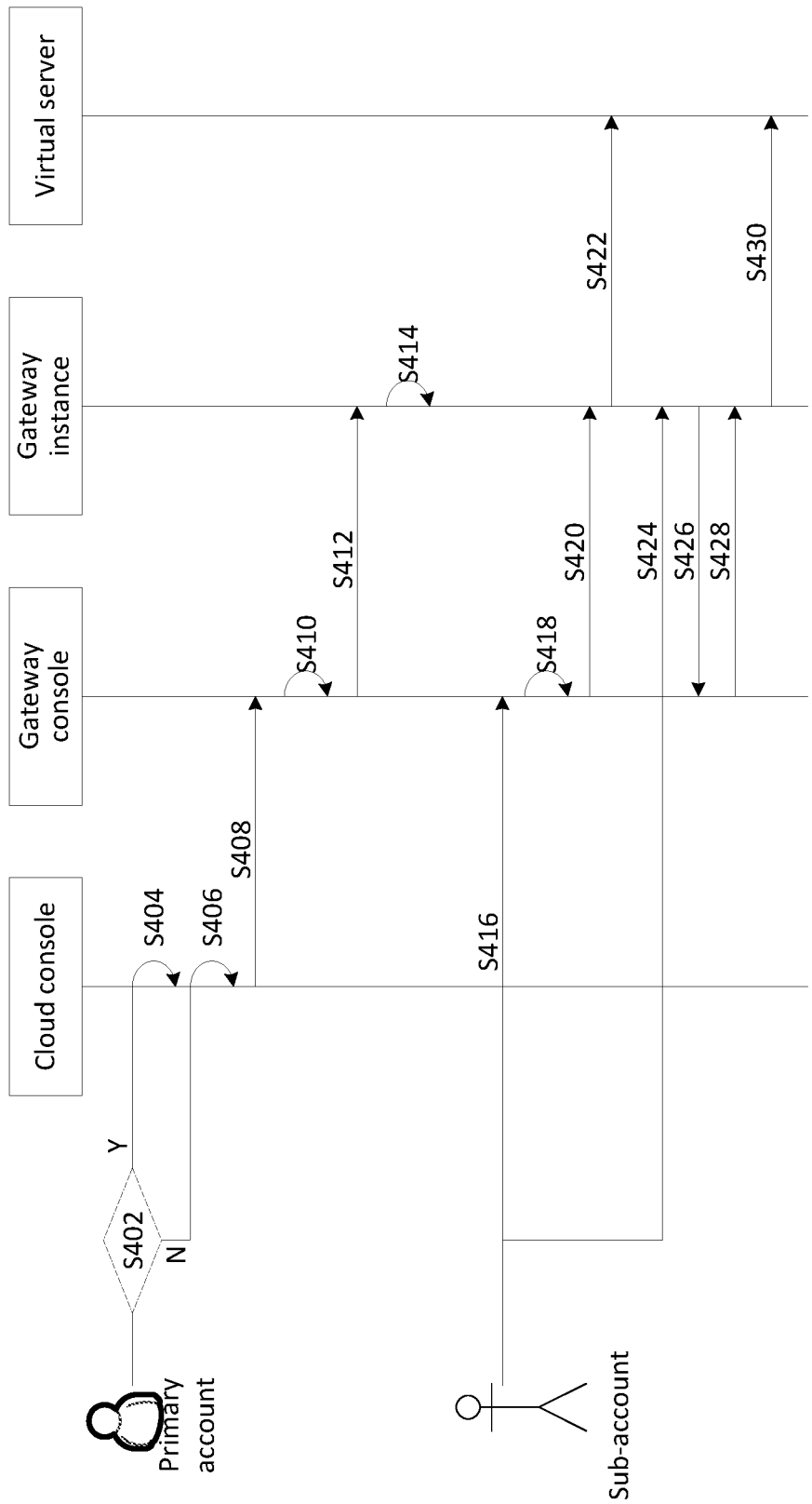
FIG. 4 is an interaction diagram of an account configuration method of a cloud device according to an example embodiment of the present disclosure.

FIG. 4 is an interaction diagram of an account configuration method of a cloud device according to an example embodiment of the present disclosure. In this example, the cloud device is a gateway, and the account configuration method of the cloud device is described below in conjunction with FIG. 4. The step of S402-S414 are the steps of writing the sub-account to the gateway.

S402: whether the cloud console has created the sub-account is determined.

S404: if the cloud console has created the sub-account, the MFA function is enabled for the sub-account.

S406, if the cloud console has not created the sub-account, the sub-account is created and the MFA function is enabled for the sub-account.

Through the above steps, the cloud console has at least one sub-account with MFA function. Such sub-account is the account used to log in the gateway.

S408: the cloud console controls the gateway console to be turned on.

For example, the gateway console is a console having a partial permission control authority of the gateway.

S410: the sub-account is synchronized to the gateway console.

S412: the gateway console selects a gateway instance, and enters the administration page of the gateway instance.

The gateway instance is the smallest unit of the gateway service, and the gateway instance selected by the gateway console is the target cloud device, i.e., the cloud device whose sub-account has permission management authority.

S414: through the administration page of the gateway instance, the sub-account is selected to be imported into the gateway instance.

Through the above steps, an option of writing the sub-account into the gateway is completed. The following steps S416-S422 is a method for performing operation and maintenance through logging into the sub-account.

S416: a sub-account user logs in to the gateway console through the sub-account.

Since the sub-account has been written into the gateway console, the gateway console can authenticate the sub-account.

S418: the gateway console authenticates the sub-account. If the authentication is successful, a token that does not require registration is generated.

For example, the cloud device console directly logs into the gateway instance using the technical solutions such as the token to avoid the process of inputting the account name and password. Such process is a process that does not require registration. When the cloud device console sends the token that does not require registration to the target cloud device, the target cloud device allows the current account to log in without registration.

S420: the gateway instance is logged in by using the token that does not require registration.

After the gateway obtains the token, there is no need to authenticate the sub-account user again, and the sub-account is allowed to log in directly.

S422: the virtual server is managed by the sub-account user.

After the user logs in the virtual server through the gateway, the user operates and manages the virtual server.

The following steps S424-S430 is another method for method for operating and managing the gateway through logging to the gateway by using the sub-account.

S424: the sub-account user directly logs in to the gateway through the sub-account.

S426: the gateway instance forwards the sub-account to the gateway console.

S428: the gateway console authenticates the sub-account and returns the authentication result to the gateway instance.

For example, after the authentication is successful, the sub-account logs into the gateway instance.

S430: the virtual server is operated and managed.

As shown, the method for configuring account of the cloud device generates a sub-account with an authority by using the primary account, and imports the sub-account into the gateway instance, so that the gateway uses the account system of the cloud account to perform the authentication, thereby eliminating the complicated steps of configuring an account system for each gateway.

It should be noted that, for ease of description, the foregoing method example embodiments are all expressed as a series of action combinations, but those skilled in the art should understand that the present disclosure is not limited by the described action sequence, because certain steps may be performed in other sequences or concurrently according to the present disclosure. Next, those skilled in the art should also understand that the example embodiments described in the specification are all preferred example embodiments, and the actions and modules involved are not necessarily mandatory to the present disclosure.

Through the description of the above example embodiments, those skilled in the art may clearly understand that the method according to the above example embodiment may be implemented by means of software plus a necessary general hardware platform, and certainly may also be implemented by hardware, but the former is the better implementation in many cases. Based on such understanding, the technical solution of the present disclosure essentially or the parts contributing to the conventional techniques may be embodied in the form of a software product. The computer software product is stored in a storage medium (such as a ROM/RAM, a magnetic disk, and an optical disc) and includes several instructions for enabling a terminal device (which may be a mobile phone, a computer, a server, a network device, or the like) to perform the methods described in various example embodiments of the present disclosure.

Figure 5:
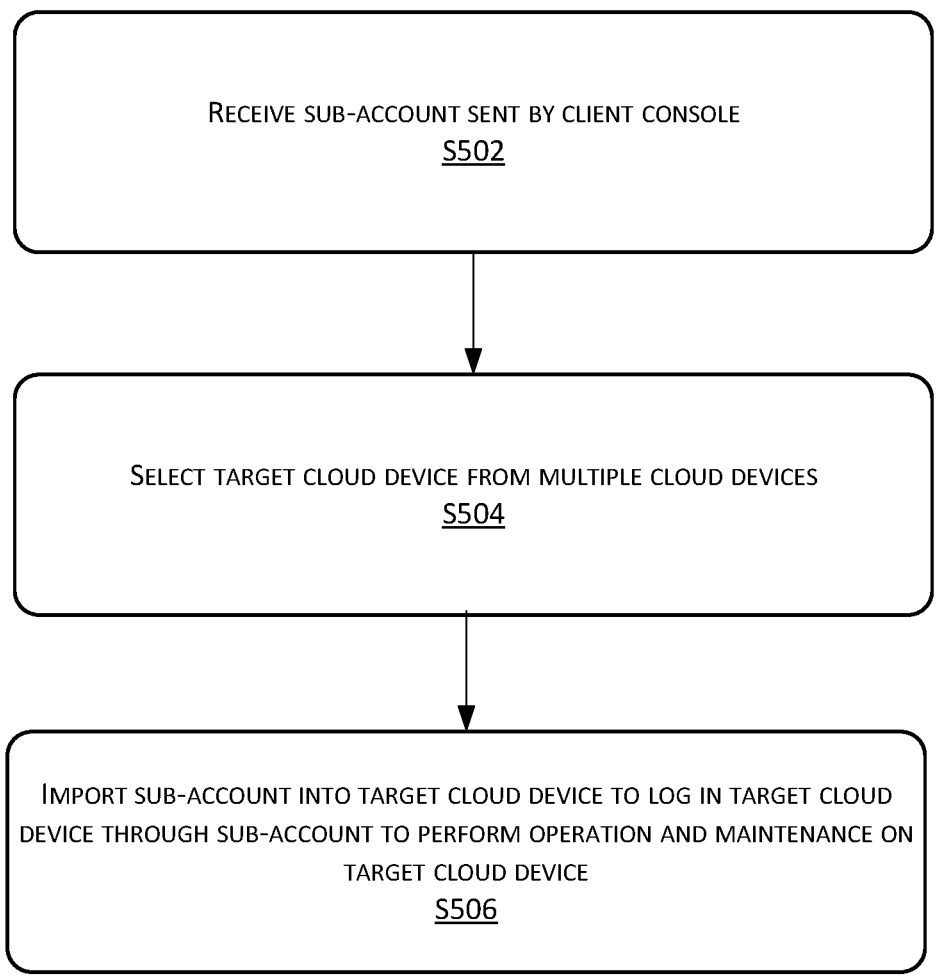
FIG. 5 is a flowchart of a method for configuring an account of a cloud device according to an example embodiment of the present disclosure.

According to an example embodiment, another method for configuring account of a cloud device is provided. FIG. 5 is a flowchart of another method for configuring account of a cloud device according to an example embodiment of the present disclosure. As shown in FIG. 5, the method includes:

Step S502: a sub-account sent by the cloud console is received. The sub-account corresponds to the primary account that currently logs into the cloud console. The primary account has a permission to access a cloud resource, and the sub-account has a part or all of the permission of the primary account.

The above step may be performed by a cloud device console. When the cloud device is a gateway, the above steps may be performed at the gateway console.

For example, the primary account is an account registered at the cloud console, and is a type of cloud account. The primary account has the permission to access all resources on the cloud and a sub-account is generated under the primary account and a permission is assigned to the generated sub-account.

For example, taking the primary account of an enterprise as an example, the enterprise registers a primary account on the cloud console, and the primary account has the permission to access all resources on the cloud. In order to facilitate access to resources on the cloud by various departments within the enterprise, the enterprise generates one or more sub-accounts on the cloud console through the primary account, and assigns corresponding permissions to the sub-accounts. For instance, the sub-account corresponding to the finance department has only the permission to access financial-related resources so that each department has access to resources related to its own business.

Step S504: a target cloud device is selected from one or more cloud devices.

For example, the target cloud device is a cloud device whose sub-account has access permission. Still using the cloud device as the gateway as the example, in the above example, the gateway console selects the gateway whose received sub-account has access permission from one or more gateways as the target gateway.

Step S506: the sub-account is imported into the target cloud device to log in the target cloud device through the sub-account to perform operation and maintenance on the target cloud device.

For example, the cloud resource includes the target cloud device.

After the sub-account is imported into the target cloud device, the target cloud device determines whether an account requesting login has the permission to log in according to the sub-account. For example, after the target cloud device receives the log-in request of the sub-account, the target cloud device authenticates the sub-account, and allows the account to log in when the authentication is successful.

In the example embodiment of the present disclosure, the sub-account sent by the cloud console is received, wherein the primary account has a permission to access a cloud resource, and the sub-account has a part or all of the permission of the primary account; the target cloud device is selected from one or more cloud devices; and the sub-account is imported into the target cloud device so that the target cloud device is logged into through the sub-account to perform operation and maintenance on the target cloud device. The above technical solutions allow the gateway to be compatible with the cloud account so that the user directly logs in to the gateway through the sub-account, thereby eliminating the need to configure an account system for each gateway and eliminating the complicated process of configuring an account system for each gateway.

Therefore, the example embodiment of the present disclosure solves the technical problem that the conventional gateway techniques need to create a specific gateway account for each gateway, which results in a complicated and complicated account configuration of the gateway.

For example, the logging-into the target cloud device through the sub-account includes: authenticating the input sub-account and generating a token that does not require registration after the authentication is successful, and using the token to log into the target cloud device.

For example, the cloud device console directly logs into the gateway instance using the technical solutions such as the token to avoid the process of inputting the account name and password. Such process is a process that does not require registration. When the cloud device console sends the token that does not require registration to the target cloud device, the target cloud device allows the current account to log in without registration.

In the above step, the authentication by the cloud device console to the sub-account may be MFA authentication of the sub-account to confirm the validity of the current account. After the authentication is successful, the user is determined to be valid to log into the target cloud device.

However, if the user directly logs in the target cloud device, the target cloud device needs to authenticate the identity of the user again, that is, the user needs to repeatedly input the account and the password. Therefore, the cloud device console sends the token that does not require registration to the target cloud device. After receiving the token that does not require registration issued by the cloud device console, the target cloud device waives the process of inputting the account and password required for logging in to the gateway.

For example, the logging into the target cloud device by using the sub-account includes: receiving the sub-account sent by the target cloud device; authenticating the sub-account; and sending the authentication result to the target cloud device.

In the above technical solution, the cloud device console authenticates the sub-account used by the user to log in.

For another example, the user inputs account information (account name and password number) in the login interface of the cloud console. The cloud console forwards the received account information to the target cloud device. The target cloud device then sends the account information to the cloud device console for authentication by the cloud device console.

Since the sub-account has been written to the target cloud device, the cloud device console successfully authenticates the sub-account if the account information is correct.

Figure 6:
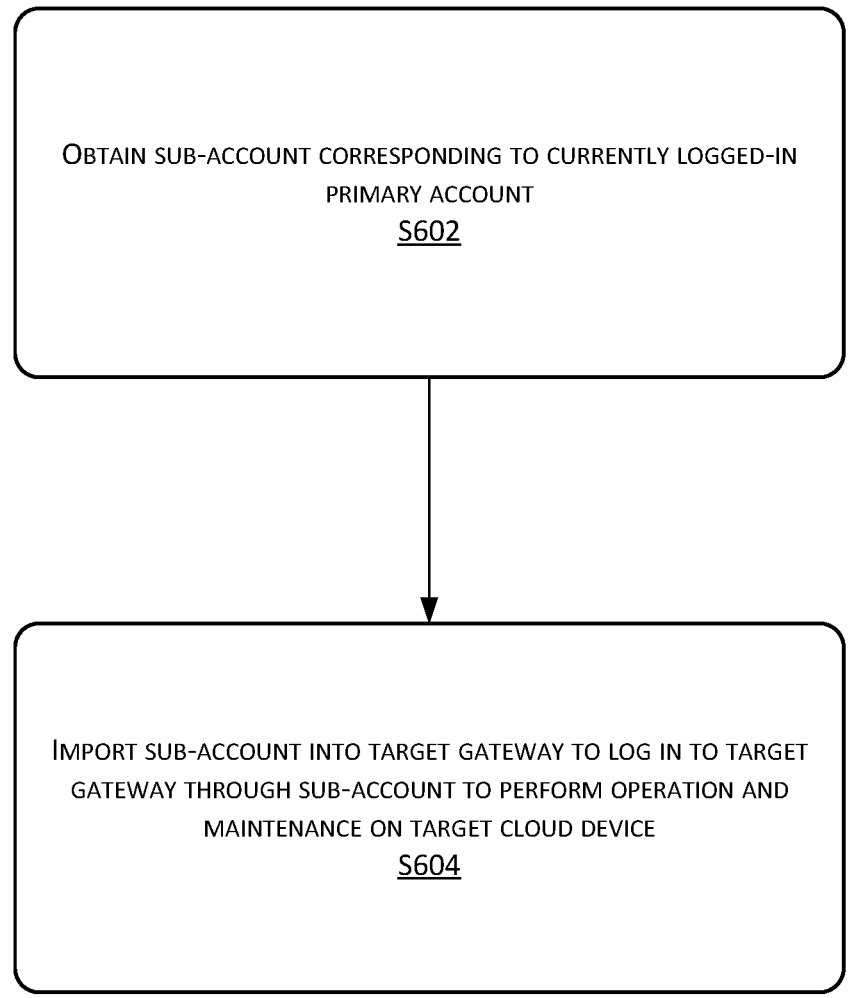
FIG. 6 is a flowchart of a method for configuring an account of a cloud device according to an example embodiment of the present disclosure.

The example embodiments of the present disclosure also provide another method for configuring account of the cloud device. FIG. 6 is a flowchart of a method for configuring an account of a cloud device according to an example embodiment of the present disclosure. As shown in FIG. 6, the method includes:

Step S602: a sub-account corresponding to the currently logged-in primary account is obtained. The primary account has a permission to access a cloud resource, and the sub-account has a part or all of the permission of the primary account.

The above step may be performed by a cloud console. The cloud console provides the users with services including user identity management and resource access control. In the cloud console, a corresponding sub-account is created or managed, and a privilege or permission of the sub-account is controlled.

For example, the primary account is an account registered at the cloud console, and is a type of cloud account. The primary account has the permission to access all resources on the cloud and a sub-account is generated under the primary account and a permission is assigned to the generated sub-account.

For example, taking the primary account of an enterprise as an example, the enterprise registers a primary account on the cloud console, and the primary account has the permission to access all resources on the cloud. In order to facilitate access to resources on the cloud by various departments within the enterprise, the enterprise generates one or more sub-accounts on the cloud console through the primary account, and assigns corresponding permissions to the sub-accounts. For instance, the sub-account corresponding to the finance department has only the permission to access financial-related resources so that each department has access to resources related to its own business.

Step S604: the sub-account is imported into the target gateway to log in to the target gateway through the sub-account to perform operation and maintenance on the target gateway.

For example, the target gateway may be a gateway whose sub-account has permission to access the cloud resource. The cloud resource includes the target cloud device.

In an example embodiment, by still using the primary account of the enterprise as an example, the sub-account created by the enterprise through the primary account is still a cloud account. The enterprise also assigns corresponding privilege or permission to the created sub-account. With respect to a sub-account, the gateway that the sub-account is allowed to access within its permission is the target gateway of the sub-account. According to step 604, the sub-account is imported into the corresponding target gateway so that the sub-account is used to log into the target gateway.

After the sub-account is imported into the target gateway, the target gateway determines whether an account that requests to log in has the permission to access. For example, when the target gateway receives the log-in request from the sub-account, the target gateway verifies the sub-account and allows the sub-account to log in after successful authentication.

The above steps may be performed by the cloud console.

The example embodiments of the present disclosure also provide another data processing method, which includes the following steps:

obtaining a sub-account of a first account, wherein the first account has a permission to access a first set of network devices, and the sub-account has a part or all of the permission of the first account, the first set of network devices include a second network device and a third network device corresponding to the second network device;

importing the sub-accounts into the second network device;

logging into the second network device using the sub-account; and accessing the third network device by using the sub-account.

For example, the first account is in a logged-in status.

As the sub-account includes part or all of the permission of the first account, after the sub-account is imported into the second network device, the sub-account is capable of being used to log into the second network device and visit the third network device corresponding to the second network device. There is no need to configure a separate account system, thereby eliminating the complicated process to assign the account system to each network device.

Figure 7:
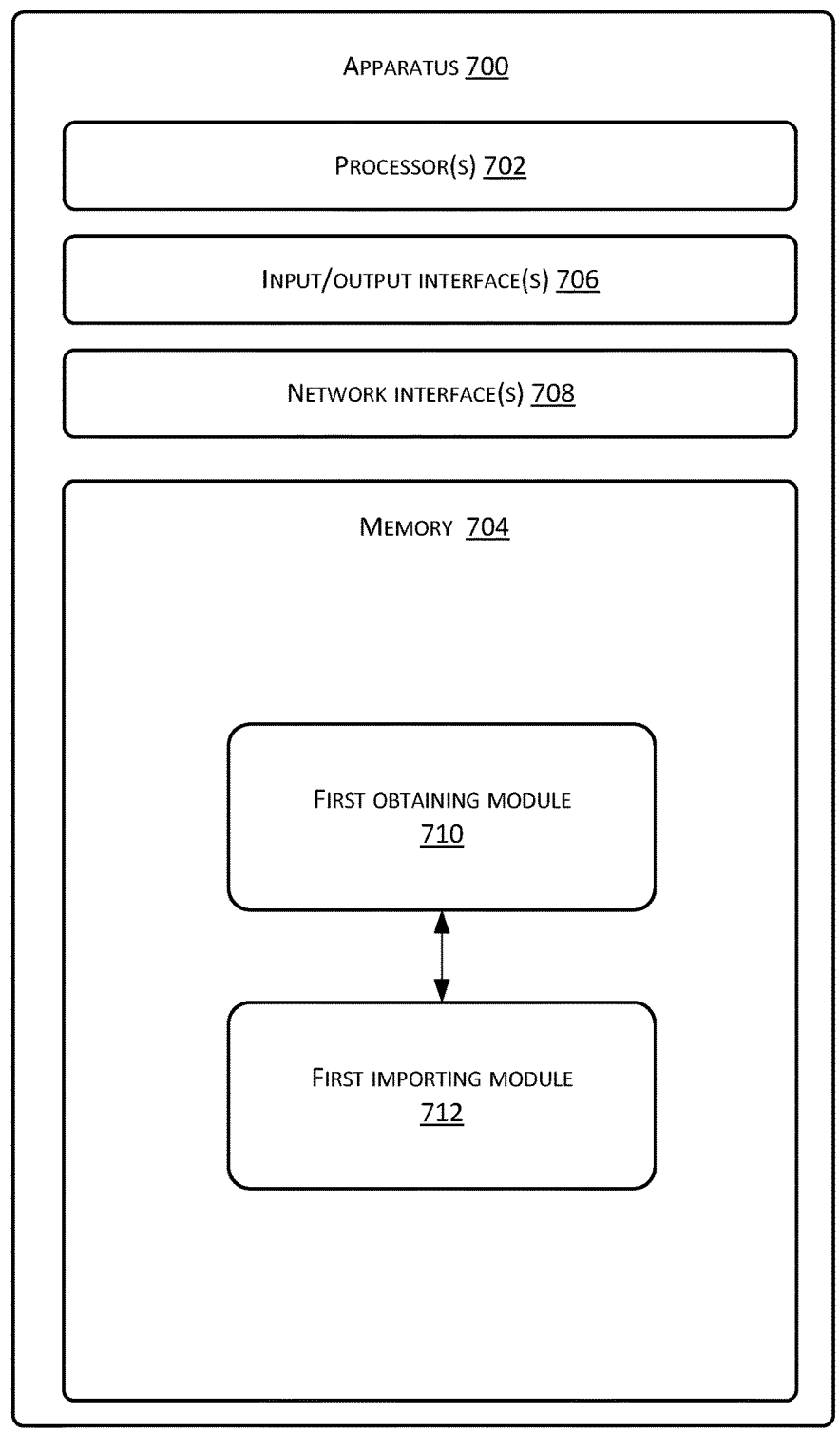
FIG. 7 is a schematic diagram of an account configuration apparatus of a cloud device according to an example embodiment of the present disclosure.

The example embodiments of the present disclosure also provide an account configuring apparatus that implements the above methods for configuring account for cloud devices. FIG. 7 is a schematic diagram of an account configuration apparatus of a cloud device according to an example embodiment of the present disclosure.

As shown in FIG. 7, an apparatus 700 includes one or more processor(s) 702 or data processing unit(s) and memory 704. The apparatus 700 may further include one or more input/output interface(s) 706 and one or more network interface(s) 708. The memory 704 is an example of computer readable medium or media.

The computer readable medium includes non-volatile and volatile media as well as movable and non-movable media, and may store information by means of any method or technology. The information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition in this text, the computer readable medium does not include transitory media, such as a modulated data signal and a carrier.

The memory 704 may store therein a plurality of modules or units including a first obtaining module 710 and a first importing module 712.

The first obtaining module 710 obtains a sub-account corresponding to a currently logged-in primary account, wherein the primary account has a permission to access a cloud resource, and the sub-account has a part or all of the permission of the primary account.

The first importing module 712 imports the sub-accounts into the target cloud device to log in to the target cloud device through the sub-account to perform operation and maintenance on the target cloud device, wherein the cloud resource includes the target cloud device.

The first obtaining module 710 and the first importing module 712 may perform the steps in S202 and S204 respectively.

For example, the first obtaining module 710 includes the following sub-modules (not shown in FIG. 7):

a determining sub-module that determines whether the primary account has a sub-account;

a creating sub-module that, if the primary account does not have the sub-account, creates the sub-account; and an obtaining sub-module that, if the primary account has created the sub-account, obtains the sub-account.

For example, the first obtaining module 710 also includes a configuring sub-module (not shown in FIG. 7) that configures a MFA function for the sub-account, and the MFA function includes account password authentication and dynamic authentication code authentication.

For example, the first importing module 712 includes a synchronizing sub-module (not shown in FIG. 7) that synchronizes the sub-account to the cloud device console so that cloud device console imports the sub-account to the target cloud device from one or more cloud devices.

For example, the first importing module 712 includes the following sub-modules (not shown in FIG. 7):

a first authenticating sub-module that logs into the cloud device console through the sub-account, verifies the sub-account by the cloud device console, and generates a token that does not require registration after the authentication is successful; and a logging-in sub-module that uses the token to log into the target cloud device.

For example, the first importing module 712 also includes a second authenticating sub-module (not shown in FIG. 7) that logs into the target cloud device through the sub-account and sends the sub-account to the cloud device console through the target cloud device for authentication.

For example, the cloud device includes the gateway.

For example, the apparatus 700 further includes an operating and managing module (not shown in FIG. 7) stored in the memory 704 that operates and manages the target cloud device. The operating and managing module may include a controlling sub-module that controls the virtual server corresponds to the gateway through the gateway.

Figure 8:
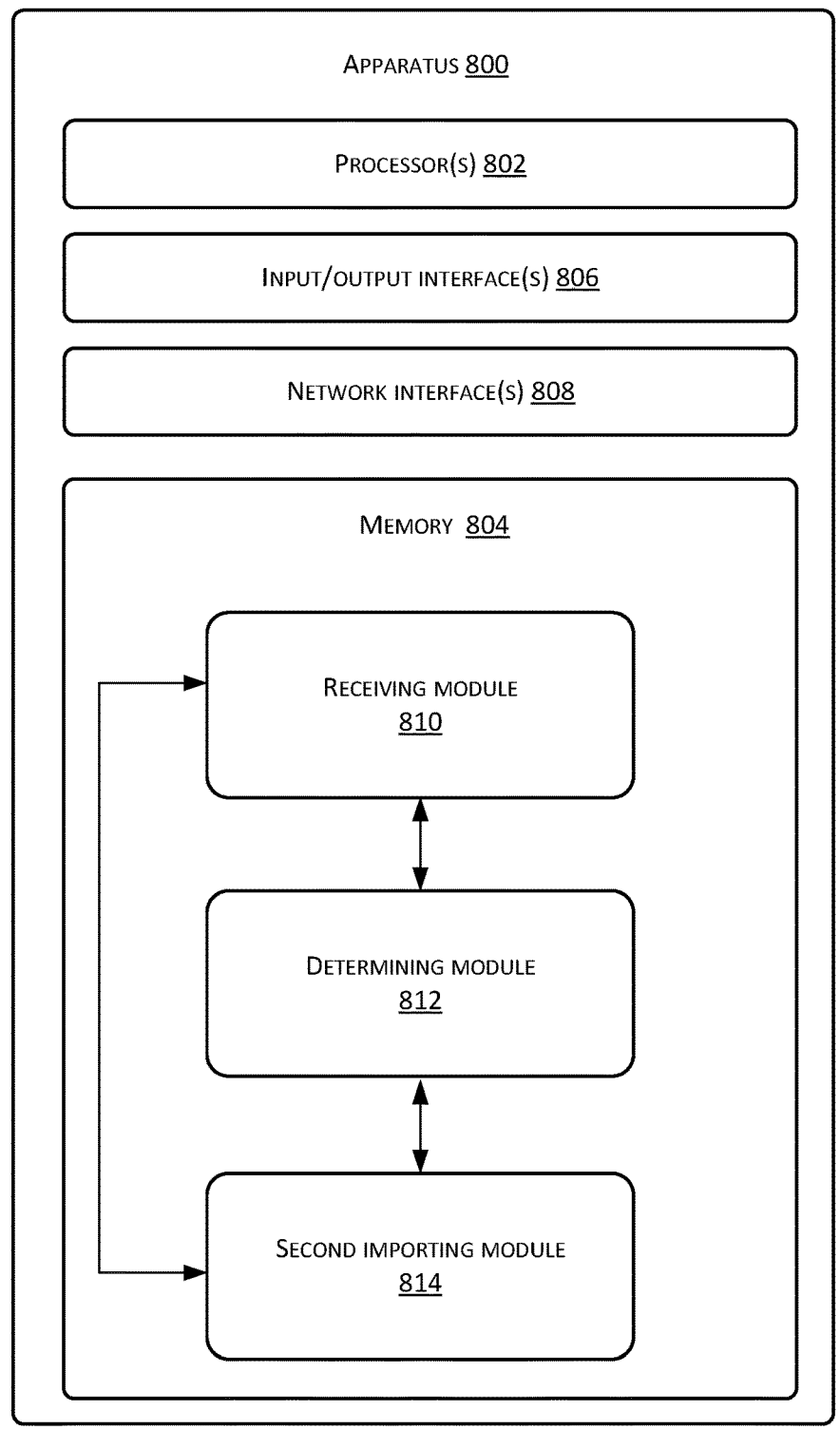
FIG. 8 is a schematic diagram of an account configuration apparatus of a cloud device according to an example embodiment of the present disclosure.

The example embodiments of the present disclosure also provide another account configuring apparatus that implements the above methods for configuring account for cloud devices. FIG. 8 is a schematic diagram of another account configuration apparatus of a cloud device according to an example embodiment of the present disclosure.

As shown in FIG. 8, an apparatus 800 includes one or more processor(s) 802 or data processing unit(s) and memory 804. The apparatus 800 may further include one or more input/output interface(s) 806 and one or more network interface(s) 808. The memory 804 is an example of computer readable medium or media.

The memory 804 may store therein a plurality of modules or units including a receiving module 810, a determining module 812, and a second importing module 814.

The receiving module 810 receives a sub-account sent by a cloud console, wherein the sub-account corresponds to a primary account that currently logs into the cloud console, wherein the primary account has a permission to access a cloud resource, and the sub-account has a part or all of the permission of the primary account.

The determining module 812 determines a target cloud device selected from the cloud device.

The second importing module 814 imports the sub-account to the target cloud device to log in to the target cloud device through the sub-account to perform operation and maintenance on the target cloud device, wherein the cloud resource includes the target cloud device.

The receiving module 810, the determining module 812, and the second importing module 814 may perform the steps in S502, S504, and S506 respectively.

For example, the second importing module 814 includes the following sub-modules (not shown in FIG. 8):

a third authenticating sub-module that authenticates the input sub-account and generates the token that require registration after the authentication is successful; and a second logging-in sub-module that uses the token to log in the target cloud device.

For example, the second importing module 814 includes the following sub-modules (not shown in FIG. 8):

a receiving sub-module that receives the sub-account sent by the target cloud device;

a fourth authenticating sub-module that authenticates the sub-account; and a sending module that sends the authentication result to the target cloud device.

Figure 9:
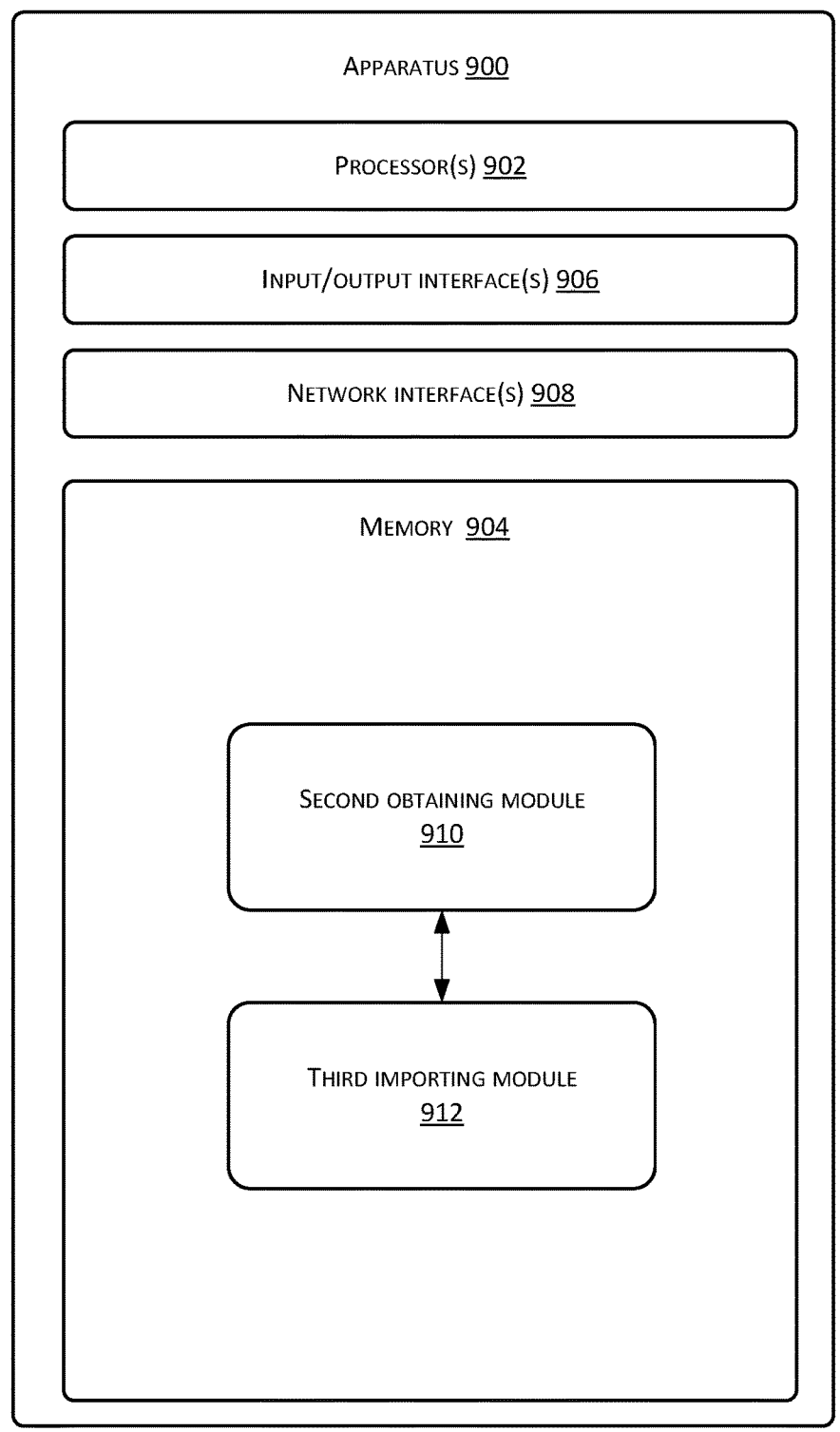
FIG. 9 is a schematic diagram of an account configuration apparatus of a cloud device according to an example embodiment of the present disclosure.

The example embodiments of the present disclosure also provide another account configuring apparatus that implements the above methods for configuring account for cloud devices. FIG. 9 is a schematic diagram of another account configuration apparatus of a cloud device according to an example embodiment of the present disclosure.

As shown in FIG. 9, an apparatus 900 includes one or more processor(s) 902 or data processing unit(s) and memory 904. The apparatus 900 may further include one or more input/output interface(s) 906 and one or more network interface(s) 908. The memory 904 is an example of computer readable medium or media.

The memory 904 may store therein a plurality of modules or units including a second obtaining module 910 and a third importing module 912.

The second obtaining module 910 obtains a sub-account corresponding to a currently logged-in primary account, wherein the primary account has a permission to access a cloud resource, and the sub-account has a part or all of the permission of the primary account.

The third importing module 912 imports the sub-account to the target gateway to log in to the target gateway through the sub-account to perform operation and maintenance on the target gateway, the cloud resource including the target gateway.

The second obtaining module 910 and the third importing module 912 may perform the steps in S602 and S604 respectively.

The example embodiments of the present disclosure also provide one or more processors to execute computer-readable instructions to perform acts including obtaining a sub-account of a first account, wherein the first account has a permission to access a first set of network devices, and the sub-account has a part or all of the permission of the first account, the first set of network devices include a second network device and a third network device corresponding to the second network device; and importing the sub-accounts into the second network device; logging into the second network device using the sub-account; and accessing the third network device by using the sub-account.

The example embodiments of the present disclosure also provide a system for configuring an account of a cloud device is provides, which includes one or more processors and one or more memories storing computer-readable instructions that, when executed by the one or more processors, cause the one or more processors to perform acts including obtaining a sub-account corresponding to a currently logged-in primary account, wherein the primary account has a permission to access a cloud resource, and the sub-account has a part or all of the permission of the primary account; and importing the sub-accounts into the target cloud device to log in to the target cloud device through the sub-account to perform operation and maintenance on the target cloud device, wherein the cloud resource includes the target cloud device.

The example embodiments of the present disclosure also provide a computer terminal. The computer terminal may be any computer terminal device among a cluster of computer terminals. For example, the computer terminal may be a mobile terminal.

For example, the computer terminal may be located in at least on network device of one or more network devices in a computer network.

In the example embodiment, the computer terminal performs the steps in the method for configuring an account of a cloud device, which includes obtaining a sub-account corresponding to a currently logged-in primary account, wherein the primary account has a permission to access a cloud resource, and the sub-account has a part or all of the permission of the primary account; and importing the sub-accounts into the target cloud device to log in to the target cloud device through the sub-account to perform operation and maintenance on the target cloud device, wherein the cloud resource includes the target cloud device.

Figure 10:
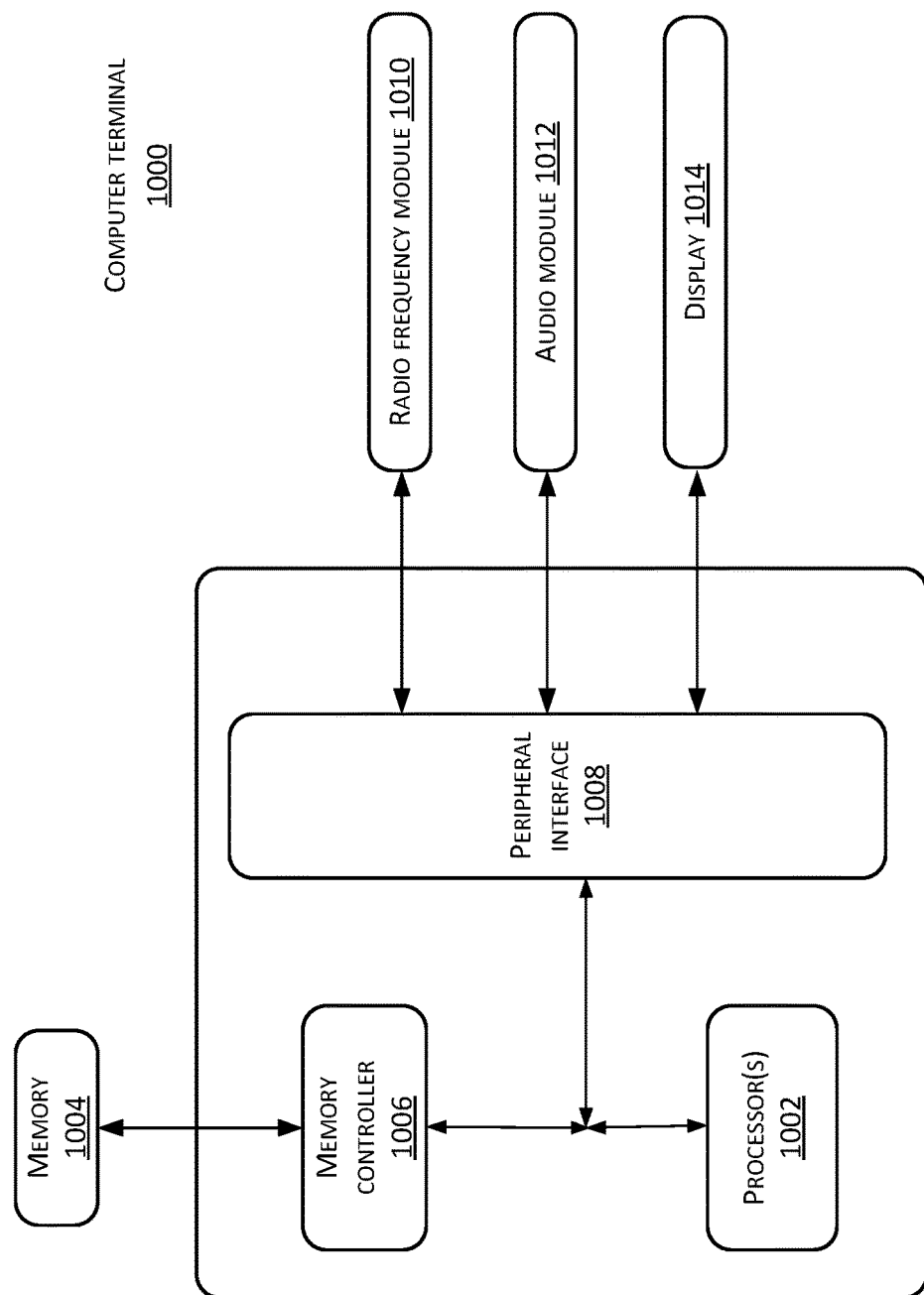
FIG. 10 is a block diagram showing the structure of a computer terminal according to an example embodiment of the present disclosure.

For example, FIG. 1000 is a structural block diagram of a computer terminal according to an example embodiment of the present disclosure. As shown in FIG. 10, a computer terminal 1000 may include one or more (only one is shown in the figure) processors 1002 and a memory 1004. The memory 1004 communicated with a memory controller 1006 that interacts with the processors 1002 and a peripherical interface 1008. The peripheral interface 1008 interacts with a radio frequency module 1010, an audio module 1012, and a display 1014.

The memory 1004 may be configured to store software programs and modules, such as the program instructions/modules corresponding to the file processing method and apparatus in the example embodiments of the present disclosure. The processor 902 operates the software programs and modules stored in the memory, thus performing various functional applications and data processing, that is, implementing the above file processing method. The memory 904 may include a high-speed random-access memory and may also include anon-volatile memory, such as one or more magnetic storage apparatuses, a flash memory, or other non-volatile solid-state memories. In some examples, the memory may further include memories disposed remote to the processor. These remote memories may be connected to the terminal over a network. Examples of the network include, but are not limited to, the Internet, an intranet, a local area network, a mobile communication network, and a combination thereof.

The processor 1002 may call, via the transmission apparatus, information and an application program stored in the memory 1004, to perform the following steps: obtaining a sub-account corresponding to a currently logged-in primary account, wherein the primary account has a permission to access a cloud resource, and the sub-account has a part or all of the permission of the primary account; and importing the sub-accounts into the target cloud device to log in to the target cloud device through the sub-account to perform operation and maintenance on the target cloud device, wherein the cloud resource includes the target cloud device.

For example, the processor 1002 may execute computer-readable instructions for the following steps: determining whether the primary account has a sub-account; if the primary account does not have the sub-account, creating the sub-account; if the primary account has created the sub-account, obtaining the sub-account.

For example, the processor 1002 may execute computer-readable instructions for the following steps: configuring a multi-factor authentication (MFA) function for the sub-account, and the MFA function includes account password authentication and dynamic authentication code authentication.

For example, the processor 1002 may execute computer-readable instructions for the following steps: synchronizing the sub-account to the cloud device console, and importing by the cloud device console the sub-account to the target cloud device selected from one or more cloud devices.

For example, the processor 1002 may execute computer-readable instructions for the following steps: logging into the cloud device console through the sub-account; authenticating the sub-account by the cloud device console, generating a token that does not require registration after the authentication is successful, and using the token to log into the target cloud device.

For example, the processor 1002 may execute computer-readable instructions for the following steps: using the sub-account to log in the target cloud device and sending the sub-account via the target cloud device to the cloud device console for authentication.

For example, the cloud device includes the gateway.

For example, the processor 1002 may execute computer-readable instructions for the following steps: controlling the virtual server corresponding to the gateway via the gateway.

In the example embodiment of the present disclosure, the sub-account corresponding to the currently logged-in primary account is obtained, wherein the primary account has a permission to access a cloud resource, and the sub-account has a part or all of the permission of the primary account; and the sub-account is imported into the target cloud device so that the target cloud device is logged into through the sub-account to perform operation and maintenance on the target cloud device. The above technical solutions allow the user to directly log in to the gateway through the sub-account, thereby eliminating the need to configure an account system for each gateway and eliminating the complicated process of configuring an account system for each gateway.

Therefore, the example embodiment of the present disclosure solves the technical problem that the conventional gateway techniques need to build a specific gateway account for each gateway, which results in a complicated and complicated account configuration of the gateway.

Those of ordinary skill in the art may understand that the structure shown in FIG. 10 is merely illustrative, and the computer terminal may also be a smart phone (such as an Android phone and an iOS phone), a tablet computer, a palmtop computer, a Mobile Internet Device (MID), a PAD, and other terminal devices. The structure of the above electronic device is not limited by FIG. 10. For example, the computer terminal A may also include more or fewer components (such as a network interface and a display apparatus) than those shown in FIG. 10, or have a configuration different from that shown in FIG. 10.

Those of ordinary skill in the art may understand that all or part of the steps of the above example embodiments may be implemented by a program instructing hardware related to the terminal device, and the program may be stored in a computer readable storage medium, and the storage medium may include a flash memory, a Read-Only Memory (ROM), a Random-Access Memory (RAM), a magnetic disk, or an optical disc.

The example embodiments of the present disclosure also provide one or more memories. The one or more memories may store the computer-readable instructions to perform any of the above methods for configuring the account of the cloud device.

For example, the one or more memories may locate in any computer terminal of a cluster of computer terminals in a computer network, or in any mobile terminal of a cluster of mobile terminals.

For example, the one or more memories storing computer-readable instructions that, when executed by one or more processors, cause the one or more processors to perform acts including: obtaining a sub-account corresponding to a currently logged-in primary account, wherein the primary account has a permission to access a cloud resource, and the sub-account has a part or all of the permission of the primary account; and importing the sub-accounts into the target cloud device to log in to the target cloud device through the sub-account to perform operation and maintenance on the target cloud device, wherein the cloud resource includes the target cloud device.

The serial numbers of the example embodiments of the present disclosure are merely for description, and do not represent the precedence of the example embodiments.

In the above example embodiments of the present disclosure, the descriptions of the example embodiments have different focuses, and the parts not detailed in a certain example embodiment may be obtained with reference to the related descriptions of other example embodiments.

In the several example embodiments provided by the present disclosure, it should be understood that the disclosed technical content may be implemented in other manners. The apparatus example embodiments described above are merely illustrative. For example, the division of units is only a logical functional division. In actual implementation, there may be other division manners. For example, one or more units or components may be combined or may be integrated into another system, or some features may be ignored or not executed. In addition, the mutual coupling or direct coupling or communication connection shown or discussed may be an indirect coupling or communication connection through some interfaces, units or modules, and may be in an electrical form or other forms.

The units described as separate components may or may not be physically separated, and the components displayed as units may or may not be physical units, that is, they may be located in one place, or may be distributed to one or more network units. Some or all of the units may be selected according to actual needs to achieve the purpose of the solution of the example embodiment.

In addition, various functional units in the example embodiments of the present disclosure may be integrated into one processing unit, or each unit may exist alone physically, or two or more units may be integrated into one unit. The integrated unit may be implemented in the form of hardware or in the form of a software functional unit.

The integrated unit, if implemented in the form of a software functional unit and sold or used as an independent product, may be stored in a computer readable storage medium. Based on such understanding, the technical solution of the present disclosure essentially or the parts contributing to the conventional techniques, or all or part of the technical solution may be embodied in the form of a software product. The computer software product is stored in a storage medium and includes several instructions for enabling a computer device (which may be a personal computer, a server, a network device, or the like) to perform all or some of steps of the methods described in various example embodiments of the present disclosure. The storage medium includes: a USB flash disk, a Read-Only Memory (ROM), a Random-Access Memory (RAM), a removable hard disk, a magnetic disk, an optical disk, or other media capable of storing program codes.

The above descriptions are only preferred example embodiments of the present disclosure, and it should be noted that those of ordinary skill in the art may also make several improvements and embellishments without departing from the principles of the present disclosure, and these improvements and embellishments should be considered as falling in the protection scope of the present disclosure.

The present disclosure may further be understood with clauses as follows.

Clause 1. A method for configuring an account of a cloud device, the method comprising:

obtaining a sub-account corresponding to a currently logged-in primary account, wherein the primary account has a permission to access a cloud resource, and the sub-account has a part or all of the permission of the primary account; and importing the sub-accounts into the target cloud device to log in to the target cloud device through the sub-account to perform operation and maintenance on the target cloud device, wherein the cloud resource includes the target cloud device.

Clause 2. The method of clause 1, wherein the obtaining the sub-account corresponding to the currently logged-in primary account includes:

determining whether the primary account has a sub-account;

in response to determining that the primary account does not have the sub-account, creating the sub-account; and in response to determining that the primary account has created the sub-account, obtaining the sub-account.

Clause 3. The method of clause 2, wherein, after the creating the sub-account, the method further comprises:

configuring a multi-factor authentication (MFA) function for the sub-account, the MFA function including an account password authentication and a dynamic authentication code authentication.

Clause 4. The method of clause 1, wherein the importing the sub-account to the target cloud device includes:

synchronizing the sub-account to the cloud device console; and importing by the cloud device console the sub-account to the target cloud device selected from one or more cloud devices.

Clause 5. The method of clause 1, wherein the importing the sub-accounts into the target cloud device to log in to the target cloud device through the sub-account to perform operation and maintenance on the target cloud device includes:

logging into the cloud device console through the sub-account;

authenticating, by the cloud device console, the sub-account and generating a token that does not require registration after the authentication is successful; and using the token to log into the target cloud device.

Clause 6. The method of clause 1, wherein the importing the sub-accounts into the target cloud device to log in to the target cloud device through the sub-account to perform operation and maintenance on the target cloud device includes:

logging in the target cloud device by using the sub-account, and sending by the target cloud device the sub-account to the cloud device console for authentication.

Clause 7. The method of any of clauses 1-6, wherein the cloud device includes a gateway.

Clause 8. The method of clause 7, wherein the importing the sub-accounts into the target cloud device to log in to the target cloud device through the sub-account to perform operation and maintenance on the target cloud device includes:

controlling, by the gateway, a virtual server corresponding to the gateway.

Clause 9. A method for configuring an account of a cloud device, the method comprising:

receiving a sub-account sent by a cloud console, wherein the sub-account corresponds to a primary account that currently logs into the cloud console, the primary account has a permission to access a cloud resource, and the sub-account has a part or all of the permission of the primary account;

determining a target cloud device from one or more cloud devices; and importing the sub-account to the target cloud device to log in to the target cloud device through the sub-account to perform operation and maintenance on the target cloud device, wherein the cloud resource includes the target cloud device.

Clause 10. The method of clause 9, wherein the importing the sub-account to the target cloud device to log in to the target cloud device through the sub-account to perform operation and maintenance on the target cloud device includes:

authenticating the input sub-account and generating a token that does not require registration after the authentication is successful; and using the token to log into the target cloud device.

Clause 11. The method of clause 8, wherein the importing the sub-account to the target cloud device to log in to the target cloud device through the sub-account to perform operation and maintenance on the target cloud device includes:

receiving the sub-account sent by the target cloud device;

authenticating the sub-account; and sending the authentication result to the target cloud device.

Clause 12. A method for configuring an account of a gateway, the method comprising:

obtaining a sub-account corresponding to a currently logged-in primary account, wherein the primary account has a permission to access a cloud resource, and the sub-account has a part or all of the permission of the primary account; and importing the sub-account to a target gateway to log in to the target gateway through the sub-account to perform operation and maintenance on the target gateway, the cloud resource including the target gateway.

Clause 13. An apparatus for configuring an account of a cloud device, the apparatus comprising:

a first obtaining module that obtains a sub-account corresponding to a currently logged-in primary account, wherein the primary account has a permission to access a cloud resource, and the sub-account has a part or all of the permission of the primary account; and a first importing module that imports the sub-accounts into the target cloud device to log in to the target cloud device through the sub-account to perform operation and maintenance on the target cloud device, wherein the cloud resource includes the target cloud device.

Clause 14. An apparatus for configuring an account of a cloud device, the apparatus comprising:

a receiving module that receives a sub-account sent by a cloud console, wherein the sub-account corresponds to a primary account that currently logs into the cloud console, the primary account has a permission to access a cloud resource, and the sub-account has a part or all of the permission of the primary account;

a determining module that determines a target cloud device selected from the cloud device; and a second importing module that imports the sub-account to the target cloud device to log in to the target cloud device through the sub-account to perform operation and maintenance on the target cloud device, wherein the cloud resource includes the target cloud device; and a second importing module that imports the sub-account to the target cloud device to log in to the target cloud device through the sub-account to perform operation and maintenance on the target cloud device, wherein the cloud resource includes the target cloud device.

Clause 15. An apparatus for configuring an account of a gateway, the apparatus comprising:

a second obtaining module that obtains a sub-account corresponding to a currently logged-in primary account, wherein the primary account has a permission to access a cloud resource, and the sub-account has a part or all of the permission of the primary account; and a third importing module that imports the sub-account to the target gateway to log in to the target gateway through the sub-account to perform operation and maintenance on the target gateway, the cloud resource including the target gateway.

Clause 16. One or more memories storing computer-readable instructions that, when executed by one or more processors, cause the one or more processors to perform acts comprising:

obtaining a sub-account corresponding to a currently logged-in primary account, wherein the primary account has a permission to access a cloud resource, and the sub-account has a part or all of the permission of the primary account; and importing the sub-accounts into the target cloud device to log in to the target cloud device through the sub-account to perform operation and maintenance on the target cloud device, wherein the cloud resource includes the target cloud device.

Clause 17. One or more processors executing computer-readable instructions to perform acts comprising:
obtaining a sub-account corresponding to a currently logged-in primary account, wherein the primary account has a permission to access a cloud resource, and the sub-account has a part or all of the permission of the primary account; and
importing the sub-accounts into the target cloud device to log in to the target cloud device through the sub-account to perform operation and maintenance on the target cloud device, wherein the cloud resource includes the target cloud device.

Clause 18. A system for configuring an account of a cloud device, the system comprising:
one or more processors; and
one or more memories storing computer-readable instructions that, when executed by the one or more processors, cause the one or more processors to perform acts including:
obtaining a sub-account corresponding to a currently logged-in primary account, wherein the primary account has a permission to access a cloud resource, and the sub-account has a part or all of the permission of the primary account; and
importing the sub-accounts into the target cloud device to log in to the target cloud device through the sub-account to perform operation and maintenance on the target cloud device, wherein the cloud resource includes the target cloud device.

Clause 19. A data processing method comprising:
obtaining a sub-account of a first account, wherein the first account has a permission to access a first set of network devices, and the sub-account has a part or all of the permission of the first account, the first set of network devices include a second network device and a third network device corresponding to the second network device;
importing the sub-accounts into the second network device;
logging into the second network device using the sub-account; and
accessing the third network device by using the sub-account.

Clause 20. The data processing method of claim 19, wherein the first account is in logged-in status.

What is claimed is:

1. A method comprising:
obtaining a sub-account corresponding to a currently logged-in primary account in a first account system, wherein the primary account has a permission to access a cloud resource, and the sub-account has a part or all of the permission of the primary account; and
importing the sub-account into a target cloud device through the first account system to directly log in to the target cloud device through the sub-account to perform operation and maintenance on the target cloud device, wherein the cloud resource includes the target cloud device, importing the sub-account into the target cloud device through the first account system enables logging into the target cloud device without going through a second account system maintained by the target cloud device, and controlling a virtual server corresponding to the target cloud device via the target cloud device, and wherein importing the sub-account into the target cloud device includes:
logging into a cloud device console through the sub-account;
performing authentication on the sub-account via the cloud device console;
generating a token that does not require registration after the authentication is successful; and
using the token to log into the target cloud device.

2. The method of claim 1, wherein the obtaining the sub-account corresponding to the currently logged-in primary account includes:
determining that the primary account has created the sub-account; and
obtaining the sub-account.

3. The method of claim 1, wherein the obtaining the sub-account corresponding to the currently logged-in primary account includes:
determining that the primary account does not have the sub-account; and
creating the sub-account.

4. The method of claim 3, wherein, after the creating the sub-account, the method further comprises:
configuring a multi-factor authentication MFA function for the sub-account.

5. The method of claim 4, wherein the MFA function includes an account password authentication and a dynamic authentication code authentication.

6. The method of claim 1, wherein the importing the sub-account to the target cloud device includes:
synchronizing the sub-account to the cloud device console; and
importing via the cloud device console the sub-account to the target cloud device selected from one or more cloud devices.

7. The method of claim 1, wherein the importing the sub-account into the target cloud device includes:
logging in the target cloud device by using the sub-account, and
sending via the target cloud device the sub-account to the cloud device console for the authentication.

8. The method of claim 1, wherein the target cloud device includes a gateway.

9. An apparatus comprising:
one or more processors; and
one or more memories storing computer-readable instructions that, when executed by the one or more processors, cause the one or more processors to perform acts including:
receiving a sub-account sent by a cloud console, the sub-account corresponding to a primary account that currently logs into the cloud console in a first account system;
determining a target cloud device from one or more cloud devices; and
importing the sub-account to the target cloud device through the first account system to directly log in to the target cloud device through the sub-account to perform operation and maintenance on the target cloud device, wherein importing the sub-account into the target cloud device through the first account system enables logging into the target cloud device without going through a second account system maintained by the target cloud device, and controlling a virtual server corresponding to the target cloud device via the target cloud device, wherein importing the sub-account to the target cloud device comprises:
performing authentication on the sub-account and generating a token that does not require registration after the authentication is successful; and
using the token to log into the target cloud device.

10. The apparatus of claim 9, wherein:
the primary account has a permission to access a cloud resource; and
the sub-account has a part or all of the permission of the primary account.

11. The apparatus of claim 10, wherein the cloud resource includes the target cloud device.

12. The apparatus of claim 9, wherein the importing the sub-account to the target cloud device includes:
receiving the sub-account sent by the target cloud device;
authenticating the sub-account; and
sending an authentication result to the target cloud device.

13. One or more memories storing computer-readable instructions that, when executed by one or more processors, cause the one or more processors to perform acts comprising:
obtaining a sub-account corresponding to a currently logged-in primary account in a first account system; and
importing the sub-account into a target cloud device through the first account system to directly log in to the target cloud device through the sub-account to perform operation and maintenance on the target cloud device, wherein importing the sub-account into the target cloud device through the first account system enables logging into the target cloud device without going through a second account system maintained by the target cloud device, and controlling a virtual server corresponding to the target cloud device via the target cloud device, and wherein importing the sub-account into the target cloud device includes:
logging into a cloud device console through the sub-account
performing authentication on the sub-account via the cloud device console;
generating a token that does not require registration after the authentication is successful; and
using the token to log into the target cloud device.

14. The one or more memories of claim 13, wherein:
the primary account has a permission to access a cloud resource; and
the sub-account has a part or all of the permission of the primary account.

15. The one or more memories of claim 14, wherein the cloud resource includes the target cloud device.

16. The one or more memories of claim 13, wherein the acts further comprise configuring a multi-factor authentication (MFA) function for the sub-account, the MFA function including an account password authentication and a dynamic authentication code authentication.

17. The one or more memories of claim 13, wherein the importing the sub-account to the target cloud device includes:
synchronizing the sub-account to the cloud device console; and
importing via the cloud device console the sub-account to the target cloud device selected from one or more cloud devices.

\* \* \* \* \*